US005262265A

United States Patent [19]

Matsunaga et al.

[11] Patent Number: 5,262,265

[45] Date of Patent: Nov. 16, 1993

[54] RESIN COMPOSITION FOR TONERS AND A TONER CONTAINING THE SAME

[75] Inventors: Takayoshi Matsunaga, Ohtsu; Susumu Tanaka, Shiga; Yoshiyuki Kosaka, Shiga; Tatsuo Suzuki, Shiga; Masazumi Okudo, Shiga, all of Japan

[73] Assignee: Sekisui Kagaku Kogyo Kabushiki Kaisha, Japan

[21] Appl. No.: 2,101

[22] Filed: Jan. 8, 1993

Related U.S. Application Data

[63] Continuation of Ser. No. 559,286, Jul. 30, 1990, abandoned.

[30] Foreign Application Priority Data

| | | | |
|---|---|---|---|
| Jul. 31, 1989 | [JP] | Japan | 1-199549 |
| Jul. 31, 1989 | [JP] | Japan | 1-199550 |
| Jul. 31, 1989 | [JP] | Japan | 1-199551 |
| Sep. 30, 1989 | [JP] | Japan | 1-255819 |
| Dec. 26, 1989 | [JP] | Japan | 1-340467 |

[51] Int. Cl.[5] .......... G03G 9/08; C08L 35/06; C08L 37/00; C08L 33/08

[52] U.S. Cl. .......... 430/109; 430/965; 430/108; 525/241; 525/208; 525/221; 525/227

[58] Field of Search .......... 430/108, 109, 965; 525/208, 221, 227, 241

[56] References Cited

U.S. PATENT DOCUMENTS

| | | | |
|---|---|---|---|
| 3,753,760 | 8/1973 | Kosel | 430/114 |
| 3,900,412 | 8/1975 | Kosel | 430/905 |
| 3,990,980 | 11/1976 | Kosel | 430/904 |
| 3,991,226 | 11/1976 | Kosel | 430/114 |
| 4,426,433 | 1/1984 | Kohri et al. | 430/109 |
| 4,882,258 | 11/1989 | Ikeuchi et al. | 430/108 |

FOREIGN PATENT DOCUMENTS

| | | |
|---|---|---|
| 3806595A1 | 10/1988 | Fed. Rep. of Germany . |
| 57-178250 | 11/1982 | Japan . |
| 61-110155 | 5/1986 | Japan . |
| 62-194260A | 2/1988 | Japan . |
| 63-214760 | 9/1988 | Japan . |
| 1-44953A | 6/1989 | Japan . |
| 1-145662A | 10/1989 | Japan . |

*Primary Examiner*—James J. Seidleck
*Assistant Examiner*—W. R. H. Clark
*Attorney, Agent, or Firm*—Fay, Sharpe, Beall, Fagan, Minnich & McKee

[57] ABSTRACT

A resin composition for toners with excellent characteristics is provided. The composition comprises, as principal components, a resin (A) containing carboxyl groups and a resin (B) containing glycidyl or β-methylglycidyl groups, wherein the resin (A) is obtained by a reaction between a multivalent metal compound (m) and copolymer α, said copolymer α being obtained from a styrene type monomer (a), a (meth)acrylic ester monomer (b), and a vinyl type monomer (c) containing carboxyl groups, and the resin (B) is copolymer β obtained from a vinyl type monomer (d) containing glycidyl or β-methylglycidyl groups and another vinyl type monomer (e).

16 Claims, No Drawings

RESIN COMPOSITION FOR TONERS AND A TONER CONTAINING THE SAME

This is a continuation of application Ser. No. 07/559,286 filed Jul. 30, 1990, now abandoned.

BACKGROUND OF THE INVENTION

1. Field of the Invention

The present invention relates to a resin composition for toners used in the development of electrostatic images in electrophotography and the like, and a toner that contains the resin composition.

2. Description of the Prior Art

Dry development methods are often employed for the development of electrostatic images in electrophotography, etc. Microgranular triboelectric developers containing dispersed colorant such as carbon black, known as toners, are employed in these dry development methods.

Generally, the toner, charged by friction, adheres by electrical attraction to the electrostatic latent image on the photoconductor, thereby forming a toner image, which is then transferred onto a paper substrate. Next, this toner image is heated and compressed with a hot roller possessing appropriate surface release properties and heated to a specified temperature, thereby fusing the toner image onto the paper.

Such toners are required to possess physical characteristics as follows.

(1) Offset resistance (i.e., the toner does not cling to the hot roller or cleaning rollers, etc.)

(2) Good fixation (i.e., the toner adheres strongly and securely to the paper).

(3) Blocking resistance (i.e., the toner particles do not agglomerate).

In addition, since the hot roller may be operated at either low or high rotational speeds, the toner is exposed to varying temperatures, depending upon the speed of the hot roller, therefore, the toner must also possess the following property.

(4) Excellent offset resistance over a wide range of temperatures.

Resin compositions for toners prepared with a view to improvement of the above-mentioned characteristics have been described, i.e., resins crosslinked with metal ions obtained by a reaction between a polymer containing carboxyl groups and a multivalent metal compound (Japanese Laid-Open Patent Publication Nos. 57-178250 and 61-110155).

In addition, for example, Japanese Laid-Open Patent Publication No. 63-214760 discloses the use of a resin composition as a toner constituent, the composition containing (i) a resin cross-linked with metal ions obtained by a reaction between a comparatively low molecular weight polymer containing carboxyl groups and a multivalent metal compound, and (ii) a comparatively high molecular weight polymer.

The aforementioned types of previously existing resin composition for toners are comparatively satisfactory as regards the aforementioned characteristics (1) to (3), but are inadequate as regards characteristic (4), i.e., offset resistance over a wide range of fixing temperatures.

If the proportion of the aforementioned multivalent metal compound is increased or a high molecular weight polymer is used in order to improve the offset properties of the toner, then the adhesion of the toner to the paper substrate deteriorates.

The provision of a cleaning roller in contact with the hot fixing roller to remove the toner which has clung to the hot roller has also been proposed. However, in this case, the toner tends to accumulate on the cleaning roller.

SUMMARY OF THE INVENTION

The resin composition for toners of this invention, which overcomes the above-discussed and numerous other disadvantages and deficiencies of the prior art, comprises, as principal components, a resin (A) containing carboxyl groups and a resin (B) containing glycidyl or $\beta$-methylglycidyl groups, wherein said resin (A) is obtained by a reaction between a multivalent metal compound (m) and copolymer $\alpha$, said copolymer $\alpha$ being obtained from a styrene type monomer (a), a (meth)acrylic ester monomer (b), and a vinyl type monomer (c) containing carboxyl groups, and said resin (B) is copolymer $\beta$ obtained from a vinyl type monomer (d) containing glycidyl or $\beta$-methylglycidyl groups and another vinyl type monomer (B).

In a preferred embodiment, the multivalent metal compound (m) is a compound containing an alkaline earth metal, or a compound containing a Group IIb metal.

In a preferred embodiment, the multivalent metal compound (m) is a metal acetate or a metal oxide.

In a preferred embodiment, the multivalent metal compound (m) is at least one selected from the group consisting of an acetate of alkaline earth metal, an oxide of an alkaline earth metal, an acetate of a Group IIb metal and an oxide of a Group IIb metal.

In a preferred embodiment, the glass transition temperature of said resins (A) and (B) are both 40° C. or more.

In a preferred embodiment, the resin composition has the glass transition temperature of 40° C. or more.

In a preferred embodiment, the weight average molecular weight of said resin (A) is in the range of 50,000 to 500,000, and the weight average molecular weight of said resin (B) is in the range of 10,000 to 500,000.

In a preferred embodiment, the resin (B) is contained in an amount of 1–50 parts by weight for every 100 parts by weight of said resin (A).

In a preferred embodiment, the copolymer $\alpha$ is obtained from 40–95% by weight of said styrene type monomer (a), 4–40% by weight of said (meth)acrylic ester monomer (b), and 1–20% by weight of said vinyl type monomer (c) containing carboxyl groups.

In a preferred embodiment, the multivalent metal compound (m) is contained in an amount of 0.1–1 mol for every 1 mol of said vinyl type monomer (c) containing carboxyl groups that is contained in said copolymer $\alpha$ as a component thereof.

In a preferred embodiment, the vinyl type monomer (c) containing carboxyl groups is contained in an amount of 1–20% by weight in said copolymer $\alpha$, said multivalent metal compound (m) is contained in an amount of 0.1–1 mol for every 1 mol of said monomer (c), and said vinyl type monomer (d) containing glycidyl or $\beta$-methylglycidyl groups is contained in an amount of 0.1–10 moles in said copolymer $\beta$ for every 1 mol of said monomer (c).

In a preferred embodiment, the vinyl type monomer (d) containing glycidyl or $\beta$-methylglycidyl groups is contained in an amount of 50% by weight or more in said resin (B), the weight average molecular weight of said resin (B) is 50,000 or more, and said resin (B) is contained in an amount of 1–30 parts by weight for every 100 parts by weight of said resin (A).

In a preferred embodiment, the resin composition further comprises a resin (C) which is copolymer α obtained from a styrene type monomer and a (meth)acrylic ester monomer, wherein the molecular weight corresponding to the peak of the molecular weight distribution curve of a reaction product of said resins (A) and (B) lies in the range of 3,000 to 80,000, and the molecular weight corresponding to the peak of the molecular weight distribution curve of said resin (C) lies in the range of 100,000 to 2,000,000.

In a preferred embodiment, the melt flow rate of said resin (A) measured at a temperature of 150° C. under a load of 1200 g is in the range of 0.1–100 g/10 min., and the melt flow rate of said resin (B) measured at a temperature of 150° C. under a load of 1200 g is in the range of 0.1–100 g/10 min.

In a preferred embodiment, the resin (B) is contained in an amount of 2–100 parts by weight for every 100 parts by weight of said resin (A).

This invention also includes a toner that contains the above-mentioned resin composition.

Thus, the invention described herein makes possible the objectives of:

(1) providing a resin composition for toners possessing excellent offset resistance characteristics over a wide range of fixing temperatures, as well as excellent fixation and blocking resistance;

(2) providing a resin composition for toners greatly improved with respect to roller fouling;

(3) providing a resin composition for toners, such that the toner particles stably retain electrical charges, and permitting the formation of sharp images without fog;

(4) providing a resin composition for toners suitable for use in electronic copying machines employing hot roller fixing processes at both high and low roller speeds; and (5) providing a toner that contains the above-mentioned excellent resin composition.

DESCRIPTION OF THE PREFERRED EMBODIMENTS

I-1. Preparation of resin compositions for toners (1)

Examples of styrene monomers (a) which are used for preparation of the resin (A) in the present invention include styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-methoxystyrene, p-phenylstyrene, p-chlorostyrene, and 3,4-dichlorostyrene. Particularly, styrene is preferably used.

Examples of (meth)acrylic ester monomers (b) include methyl (meth)acrylate, ethyl (meth)acrylate, propyl (meth)acrylate, n-butyl (meth)acrylate, isobutyl (meth)acrylate, n-octyl (meth)acrylate, dodecyl (meth)acrylate, 2-ethylhexyl (meth)acrylate, lauryl (meth)acrylate, stearyl (meth)acrylate, dimethylaminoethyl (meth)acrylate, and methyl α-chloroacrylate. Methyl methacrylate, n-butyl(meth)acrylate, and 2-ethylhexyl acrylate and preferably used.

Examples of vinyl monomers (c) containing carboxyl groups include (meth)acrylic acid, α-ethylacrylic acid, crotonic acid, isocrotonic acid, β-methylcrotonic acid, fumaric acid, maleic acid, itaconic acid, and halfester compounds of the following formula (1):

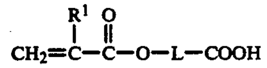

(1)

wherein L represents a bivalent bonding group with three or more carbon atoms which contains at least one ester linkage, and $R^1$ is hydrogen or methyl.

The above-mentioned halfester compounds can be obtained by the esterification reaction of (meth)acrylate derivatives with hydroxyl groups; and aliphatic dicarboxylic acid such as succinic acid, malonic acid and glutaric acid, or aromatic dicarboxylic acid such as phthalic acid. The hydroxyl groups of the said dicarboxylic acids can be substituted with halogen, lower alkyl groups, or alkoxy groups.

Examples of these halfester compounds include mono(meth)acryloyloxyethyl succinate, mono(meth)acryloyloxypropyl succinate, mono(meth)acryloyloxyethyl glutarate, mono(meth)acryloyloxyethyl phthalate, and mono(meth)acryloyloxypropyl phthalate.

Examples of metals contained in multivalent metal compounds (m) include Cu, Ag, Be, Mg, Ca, Sr, Ba, Zn, Cd, Al, Ti, Ge, Sn, V, Cr, Mo, Mn, Fe, Co, and Ni. Alkaline earth metals and Group IIb metals are preferred, particularly, Mg and Zn are preferred.

Examples of multivalent metal compounds (m) include metal fluorides, chlorides, chlorates, bromides, iodides, oxides, hydroxides, sulfides, zincates, sulfates, selenides, tellurides, nitrides, nitrates, phosphides, phosphinates, phosphates, carbonates, orthosilicates, acetates, and oxalates. The multivalent metal compounds (m) also include lower-alkyl metal compounds such as methylated and ethylated metal. Particularly, metal oxide and metal acetates are preferred.

The copolymer α can be prepared from a styrene monomer (a), a (meth)acrylic ester monomer (b) and a vinyl monomer (c) containing carboxyl groups by any of the known conventional one-stage or two-stage polymerization methods, such as the solution polymerization method, suspension polymerization method, emulsion polymerization method, bulk polymerization method, etc. In such cases, the proportion of the styrene monomer (a) contained in the copolymer α should desirably be in the range of 40–95% by weight, and more preferably, 60–90% by weight, the proportion of the (meth)acrylic ester monomer (b) should desirably be 4–40% by weight, more preferably 10–40% by weight, and the proportion of the vinyl monomer (c) containing carboxyl groups should desirably be 1–20% by weight, and more preferably 2–10% by weight.

If the proportion of the styrene monomer (a) is less than 40% by weight, then the crushability of the toner may deteriorate. If the proportion of the (meth)acrylic ester monomer (b) is less than 4% by weight, then the fixing characteristics of the toner may deteriorate. If the proportion of the vinyl monomer (c) containing carboxyl groups is less than 1% by weight, then the reaction between the obtained copolymer α and the multivalent metal compound (m), and the reaction between resin (A) and resin (B) may be inadequate, and consequently the offset resistance of the toner may not manifest appreciable improvement. On the other hand, if the proportion of the aforementioned monomer (c) exceeds 20% by weight, then the properties of the toner are prone to change with the environment. For example, at high temperatures or high humidities, the electrical charging characteristics of the toner cannot be kept at a constant level, or the characteristics of blocking resistance may deteriorate.

In order to effect the reaction of the multivalent metal compound (m) with the aforementioned copolymer, the desirable procedure comprises the steps of preparing the copolymer α by solution polymerization, then adding the multivalent metal compound (m) (dispersed, if necessary, in an organic solvent) into the reaction mixture, and forming the resin (A) by heating the mixture at an appropriate temperature, following which the resin (A) is obtained by removing the solvent with distillation. The multivalent metal compound (m) can also be dispersed within the reaction system together with an organic solvent prior to initiating the polymerization reaction used for preparation of the copolymer α. The resin (A) can also be obtained by admixing the multivalent metal compound (m) with the copolymer α, after the latter has been obtained by solution polymerization, then removing the solvent by distillation, and then applying a fusion and kneading process using a device such as a roll mill, kneader or extruder at an appropriate temperature.

The multivalent metal compound (m) should desirably be used in an amount of 0.1-1 mol for every 1 mol of the aforementioned vinyl monomer (c) containing carboxyl groups, while the reaction temperature should desirably be in the range of 100°-200° C.

If the molar ratio of the multivalent metal (m) to the monomer (c) is less then 0.1, then reaction of the said multivalent metal compound (m) with the obtained copolymer α is inadequate, and consequently the effectiveness of this reaction in improving the offset resistance of the toner may diminish.

The resin (B) contained in the composition of this invention has an ability to react with resin (A) mentioned above, thus forming a third polymer having a higher molecular weight. Therefore, in the process of preparing a toner using the said resins (A) and (B), and in the process of fixing the toner by a heat roller, the third polymer can be formed.

The vinyl monomers (d) containing glycidyl or β-methylglycidyl groups appropriately used for preparing the resin (B) include glycidyl (meth)acrylate, β-methylglycidyl (meth)acrylate, allyl glycidyl ether, etc.

The other vinyl monomer (e) which is applicable for reaction with the aforementioned vinyl monomer (d) containing glycidyl or β-methylglycidyl groups includes the styrene monomers (a) used in the aforementioned resin (A), and the aforementioned (meth)acrylic ester monomers (b), as well as vinyl acetate, vinyl propionate, vinyl chloride, ethylene, propylene, etc. The use of a styrene monomer (a), or a combination of a styrene polymer (a) and a (meth)acrylic ester monomer (b) is particularly desirable.

The copolymer β to be formed by the reaction between the vinyl monomer (d) containing glycidyl or β-methylglycidyl groups and the other vinyl monomer (e) can be prepared by any of various generally known conventional one-stage or two-stage polymerization methods, such as the solution polymerization method, suspension polymerization method, emulsion polymerization method, bulk polymerization method, etc.

In such cases, the copolymerization should desirably be performed so that the vinyl monomer (d) containing glycidyl or β-methylglycidyl groups is contained in the copolymer β in an amount of at least 10% by weight. If the proportion of the vinyl monomer (d) is less than 10% by weight, then the reaction of resin (B) with resin (A) is inadequate, and consequently the desired effects in improving the offset resistance characteristics of the toner may not be manifested.

The monomer (d) and the other vinyl monomer (e) should desirably be copolymerized so that the amount of the monomer (d) is contained in the range of 0.1-10 moles for every 1 mol of the aforementioned monomer (c) that is contained in the resin (A) as a component thereof. If the molar ratio of monomer (d) to monomer (c) is less than 0.1, then the reaction of the resin (B) with the resin (A) is inadequate and consequently the desired effects in improving the offset resistance characteristics of the toner may not be manifested. On the other hand, if the molar ratio of monomer (d) to monomer (c) is greater than 10, then the reaction of resin (B) with resin (A) is excessive, and consequently the fixation characteristics of the toner may deteriorate.

The glass transition temperatures of both the resins (A) and (B) prepared in the aforementioned manner should desirably be at least 40° C. If the glass transition temperature of at least one of these resins is less than 40° C., then the blocking resistance or fluidity of the resulting toner may deteriorate. The weight average molecular weight of resin (A) should desirably be in the range of 50,000-500,000, while the weight average molecular weight of resin (B) should desirably be in the range of 10,000-500,000, and more preferably 50,000-300,000.

The mixing or kneading of resins (A) and (B) can be performed, for example, by the following methods.

(1) Resins (A) and (B) are pulverized, and then mixed with a device such as a ribbon blender, Henschal mixer, etc.

(2) Resins (A) and (B) are fused and kneaded with a roll mill, kneader or extruder at a temperature, for example, in the range of 100°-200° C., followed by cooling and then pulverization.

(3) Resins (A) and (B) are dissolved and mixed in an organic solvent with a low boiling point, then the solvent is removed by distillation and the residue is pulverized.

Thus, the resin composition for toners of the present invention, containing resins (A) and (B), can be produced in the manner indicated above. The glass transition temperature of the resin composition for toners should desirably be at least 40° C. If the glass transition temperature of the composition is lower than 40° C., then the storage life or fluidity of the toner may deteriorate.

In some circumstances, with a view to more effective prevention of offsetting, a cleaning roller is installed together with the hot roller used for fixing. In such cases, the toner tends to accumulate on the cleaning roller.

In order to prevent the clinging of the toner to the heat roller (i.e., to improve the offset resistance characteristics) as well as efficiently preventing the fouling of the cleaning roller, a resin (B) having relatively greater weight average molecular weight should be used. Moreover, it is preferable for this purpose, that the amount of the vinyl monomer (d) containing glycidyl or β-methylglycidyl groups that is contained in resin (B) should be comparatively large, and that the ratio of resin (B) to resin (A) should be comparatively low.

In such cases, the amount of the vinyl monomer (d) containing glycidyl or β-methylglycidyl groups contained in the resin (B) should desirably be 50% by weight or more. If the amount of the vinyl monomer (d) is less than 50% by weight, then the reaction of resin (B) with resin (A) is inadequate, and consequently the desired effects in improving the offset resistance characteristics of the toner may not be manifested.

Also, the weight average molecular weight of the resin (A) should desirably be in the range of 50,000 to 500,000. The weight average molecular weight of the resin (B) should desirably be 50,000 or more, and preferably in the range of 50,000 to 300,000. If the weight average molecular weight of the resin (B) is less than 50,000, then the degree of desired improvement with respect to the fouling of the roller is little.

The proper mixing ratio of resin (A) and resin (B) varies according to the content of carboxyl groups in resin (A) and the content of glycidyl or β-methylglycidyl groups in resin (B). In general, the resin (B) should desirably be contained in an amount of 1–30 parts by weight and preferably 2–10 parts by weight, for every 100 parts by weight of resin (A). If the amount of resin (B) is less than 1 part by weight, then the reaction of resin (B) with resin (A) is inadequate, and consequently the toner so obtained may not manifest the desired improvement of offset resistance. On the other hand, if the amount of resin (B) exceeds 30 parts by weight, then the fixation characteristics of the toner may deteriorate.

To the extent that the purposes of the present invention can still be achieved, the resin composition for toners of the present invention may also contain various additives, including resins such as polystyrene, polyvinyl acetate, polyvinyl chloride, polyamide resins, polyethylene, polypropylene, polyester resins, acrylic resins, styrene-butadiene copolymers, epoxy resins, etc.

I-2. Preparation of resin compositions for toners (2)

Independent of their glass transition temperatures, the melt flow rates (MFR) of both of the resins (A) and (B) used in the present invention should desirably be in the range of 0.1–100 g/10 min., and more preferably 0.5–60 g/10 min. The melt flow rates (MFR) as indicated in the present invention were measured in accordance with the method of JIS K7210, at a temperature of 150° C. and under a load of 1200 g. If the melt flow rate is less than 0.1 g/10 min., then the desired improvement with respect to fouling of the roller is inadequate, and moreover, the fixation of the toner onto the paper substrate may deteriorate. On the other hand, if the melt flow rate exceeds 100 g/10 min., then the offset resistance or fixation characteristics may deteriorate.

When the resin composition for toners is obtained by mixing or kneading resins (A) and (B) having melt flow rates in the aforementioned range, the mixing ratio of resins (A) and (B) [i.e., resin (A)/resin (B)] should desirably be in the range of 100/1 to 1/100 (weight ratio), and more preferably, 100/2 to 100/100.

If the mixing ratio exceeds 100/1, or is less than 1/100, then the reaction between resin (A) and resin (B) is inadequate, and consequently the desired effects in improving the offset resistance characteristics of the toner may not be manifested.

In particular, the use of a resin (B) with a comparatively low melt flow rate and a comparatively high content of the vinyl monomer (d) containing glycidyl or β-methylglycidyl groups, as well as a comparatively low proportion of this resin (B) in the preparation of the toner, is efficacious in improving the offset resistance of the toner and preventing the fouling of the roller.

Selecting the mixing ratio of resin (A) and resin (B) in the range of 100/30 to 100/100 (weight ratio) also has the advantage of shortening the hot mixing and kneading time in the toner manufacturing process. This is attributed to a more rapid reaction between the glycidyl or β-methylglycidyl groups of resin (B) and the carboxyl groups of resin (A).

The components and process for the preparation of resins (A) and (B) as well as the process for the production of the desired resin composition for toners are the same as those described in the above Section I-1.

I-3. Preparation of resin compositions for toners (3)

The resin composition for toners of the present invention comprises a resin (C) as required. The resin (C) is copolymerγ obtained from a styrene type monomer and a (meth)acrylic ester monomer.

In cases where the resin composition contains the resin (C), the weight average molecular weight of the resins (A) and (B) are different from those of the resins (A) and (B) which are used in the section of preparation of resin compositions for toners (1). When the resin (C) is contained in the composition, the molecular weight corresponding to the peak of the molecular weight distribution curve of the reaction product of the resins (A) and (B) should desirably be in the range of 3,000 to 80,000. If the molecular weight corresponding to the peak of the distribution curve is less than 3,000, then the offset resistance or fluidity of the toner may deteriorate. On the other hand, if the molecular weight exceeds 80,000, then the fixation characteristics of the toner may deteriorate.

The styrene monomers and (meth)acrylic ester monomers appropriate for use in resin (C) can be the same as those used in the resin (A). Among these, styrene itself is particularly desirable as the styrene monomer, while methyl methacrylate, n-butyl (meth)acrylate and 2-ethylhexyl acrylate are particularly desirable as the (meth)acrylic ester monomer.

The resin (C), i.e., copolymerγ that is obtained from a styrene monomer and a (meth)acrylic ester monomer, can be manufactured by any of the well-known conventional one-stage or two-stage polymerization processes, such as solution polymerization, suspension polymerization, emulsion polymerization, or bulk polymerization, etc.

The proportion of the styrene monomer contained in copolymerγ should desirably be in the range of 40–95% by weight, and more preferably 60–95% by weight, and that of the (meth)acrylic ester monomer should desirably be in the range of 5–60% by weight, and more preferably 10–40% by weight. If the proportion of the styrene monomer is less than 40% by weight, then the blocking resistance of the toner may deteriorate. On the other hand, if the proportion of the (meth)acrylic ester monomer contained in the copolymer is less than 5% by weight, then the fixation characteristics of the toner may deteriorate.

The glass transition temperature of the resin (C) prepared in the aforementioned manner should desirably be 40° C. or more. If the said glass transition temperature is less than 40° C., then the blocking resistance or the fluidity of the toner so obtained may deteriorate. Furthermore, the molecular weight corresponding to the peak of the molecular weight distribution curve of resin (C) should desirably be in the range of 100,000–2,000,000. If the said molecular weight corresponding to the peak of the curve is less than 100,000, then the offset resistance of the toner may deteriorate. On the other hand, if the said molecular weight corresponding to the peak of the curve exceeds 2,000,000, then the fixation characteristics of the toner may deteriorate.

In cases where the resin composition for toners of the present invention are to contain the resin (C), then the final resin composition can be obtained by mixing or kneading together the aforementioned resins (A), (B) and (C), simultaneously applying heat if necessary. The appropriate mixing ratio of the resins (A), (B) and (C) depends upon the number of carboxyl groups contained in resin (A) and the number of glycidyl or $\beta$-methylglycidyl groups contained in resin (B). In general, the amount of resin (B) should desirably be in the range of 1-100 parts by weight, and preferably, 10-50 parts by weight for every 100 parts by weight of the resin (A), and the amount of resin (C) should desirably be 1-100 parts by weight, and preferably, 10-60 parts by weight for every 100 parts by weight of the resin (A).

If the amount of resin (B) is less than 1 part by weight, then the reaction of resin (B) with resin (A) is inadequate, and consequently the desired effects in improving the offset resistance characteristics of the toner may not be manifested. On the other hand, if the amount of resin (B) is greater than 100 parts by weight, then the fixation characteristics of the toner may deteriorate. If the amount of resin (C) is less than 1 part by weight, then the offset resistance of the toner may deteriorate, whereas if the amount of resin (C) exceeds 100 parts by weight, then the fixation characteristics of the toner may deteriorate.

The mixing or kneading together of resins (A), (B), and (C) can be performed, for example, by the following methods.

(1) Pulverizing resins (A), (B), and (C), and then mixing these with a device such as a ribbon blender, Henschel mixer, etc.

(2) Using a roll mill, kneader or extruder, etc. to fuse and knead resins (A), (B), and (C) at a temperature, for example, in the range of 100°-200° C., followed by cooling and then pulverization.

(3) Dissolving and mixing resins (A), (B), and (C) in an organic solvent with low boiling point, then removing the solvent by distillation and pulverizing the residue.

In any of the aforementioned methods (1)-(3), any two of the resins can be mixed or kneaded together, and the mixture can be then mixed or kneaded together with the remaining resin. Alternatively, the monomers which constitute one of the resins can be polymerized in the system formed by dissolving the other two resins in an organic solvent.

Alternatively, a method described in the Examples in the aforementioned Japanese Laid-Open Patent Publication No. 63-214760 can be employed. The method includes the steps of, preparing a solution containing a mixture of resins (A) and (C) in accordance with the two-stage solution polymerization method, the mixture having double-peaked molecular weight distribution, mixing and dissolving resin (B) in the solution, and removing the solvent by distillation.

In this manner, a resin composition for toners of the present invention, containing the resins (A), (B) and (C), can be produced.

II. Preparation of toner

The preparation of toners using the resin composition of the present invention can be accomplished by one of the following methods.

(1) Into a mixture of pulverized forms of the resins (A), (B) and, if necessary, (C), a colorant such as carbon black, and if necessary, any other well-known conventional toner additives are mixed using a device such as a ribbon blender or Henschel mixer. Then, by the use of a device such as a roll mill, kneader or extruder, the mixture is fused and kneaded at a temperature, for example, in the range of 100°-200° C., and then the material is cooled and pulverized.

(2) Into a mixture of pulverized forms of the resins (A), (B) and, if necessary, (C), a colorant such as carbon black, and if necessary, any other well-known conventional toner additives are mixed, then, by the use of a device such as a roll mill, kneader or extruder, the mixture is fused and kneaded at a temperature, for example, in the range of 100°-200° C., and then the material is cooled and pulverized.

Thus, in accordance with the present invention, an excellent resin composition for toners, and a toner employing the said composition can be obtained. The toner is characterized by excellent offset resistance over a wide range of temperatures, and, moreover, possessing excellent fixation characteristics and blocking resistance. The aforementioned characteristics are attributed to an increase in the molecular weight of the resin constituents resulting from the progress of cross-linking reactions between resin (A) and resin (B) during the toner manufacturing process and the toner utilization process (i.e., fixing by a hot roller).

EXAMPLES

Specific examples of the present invention and comparative examples will be described below.

Measurements of physical properties were performed by the following methods.

(1) Weight average molecular weight was measured by gel permeation chromatography (GPC) under the following conditions.

Temperature: 25° C.

Sample solution: 0.2% by weight of tetrahydrofuran solution

Solvent flow rate: 1.0 ml/min.

Amount of injected sample: 100 μl

Measuring apparatus:

Column: HSG Series manufactured by Shimadzu Corporation

Detector: refractive index (RI) detector

A calibration curve was prepared by the use of several monodisperse standard polystyrene (PST) samples.

The conditions of measurement were adjusted such that the molecular weight distribution of the tested resin was in a range where the relation between the logarithms of the molecular weights and the volume of eluant was linear in the calibration curve.

(2) Glass transition temperature was measured with a differential scanning calorimeter (DSC).

(3) Blocking resistance was evaluated by placing 10 g of toner in a 100 ml beaker, leaving the sample for 24 hours in a thermostat at 60° C., and observing the state of agglomeration of the particles of the toner.

(4) The fixing temperature range i.e., the temperature range in which fixing can be performed was determined by the following procedure. A finely powdered developer was prepared from the toner, and the developer was loaded into an appropriately modified electrophotographic copying machine, Konica U-Bix 2500. The fixing temperature range was determined by varying the temperature setting of the hot roller used for fixing and recording the temperature settings at which satisfactory fixing without offset was accomplished.

(5) Fixation characteristics were evaluated as fixation rate (%) which was measured as follows. The temperature of the hot roller used for fixing was set at 170° C., the image so obtained were reciprocally rubbed by a fastness tester 5 times. The residual image was measured with a Macbeth reflection densitometer, and the residual percentage of the image is regarded as the fixation rate (%).

(6) The molecular weight corresponding to the peak of the molecular weight distribution curve of the tested resin was measured by GPC under the conditions shown in section 1 above.

(7) Melt flow rates were measured in accordance with JIS K7210, at a temperature of 150° C. under a load of 1200 g.

PREPARATION OF RESIN (A) CONTAINING CARBOXYL GROUPS

EXAMPLE 1

One hundred parts by weight of a copolymer containing 80% by weight of styrene, 18% by weight of butyl acrylate and 2% by weight of acrylic acid as components thereof and 0.7 parts by weight of magnesium oxide were added to toluene, and the mixture was refluxed with stirring for 2 hours. Then the toluene was removed by distillation, thereby obtaining resin (A)-1 containing carboxyl groups that has a weight average molecular weight of 215,000 and glass transition temperature of 60° C.

EXAMPLE 2

One hundred parts by weight of a copolymer containing 72% by weight of styrene, 8% by weight of methyl methacrylate, 16% by weight of butyl acrylate and 4% by weight of acrylic acid, and 0.7 parts by weight of zinc oxide were added to toluene, and the mixture was allowed to react in the same manner as in Example 1, resulting in resin (A)-2 containing carboxyl groups that has a weight average molecular weight of 180,000, and glass transition temperature of 61° C.

EXAMPLE 3

One hundred parts by weight of a copolymer containing 82% by weight of styrene, 14% by weight of butyl methacrylate and 4% by weight of monomethacryloyloxyethyl succinate, and 0.4 parts by weight of zinc oxide were added to toluene, and the mixture was allowed to react in the same manner as in Example 1, resulting in resin (A)-3 containing carboxyl groups that has a weight average molecular weight of 63,000 and glass transition temperature of 61° C.

EXAMPLE 4

One hundred parts by weight of a copolymer containing 70% by weight of styrene, 25% by weight of butyl methacrylate and 5% by weight of monomethacryloyloxyethyl succinate, and 0.8 parts by weight of calcium oxide were added to toluene, wherein the molar ratio of calcium oxide to monomethacryloyloxyethyl succinate was 0.24. Then, the mixture was allowed to react in the same manner as in Example 1, resulting in resin (A)-4 containing carboxyl groups that has a weight average molecular weight of 210,000, and glass transition temperature of 68° C.

EXAMPLE 5

One hundred parts by weight of a copolymer containing 70% by weight of styrene, 15% by weight of methyl methacrylate, 10% by weight of butyl acrylate and 5% by weight of monomethacryloyloxyethyl succinate, and 0.7 parts by weight of calcium acetate were added to toluene, and the mixture was allowed to react in the same manner as in Example 1, resulting in resin (A)-5 containing carboxyl groups that has a weight average molecular weight of 156,000, and glass transition temperature of 65° C.

EXAMPLE 6

One hundred parts by weight of a copolymer containing 80% by weight of styrene, 5% by weight of methyl methacrylate, 10% by weight of butyl acrylate and 5% by weight of methacrylic acid, and 0.5 parts by weight of magnesium oxide were added to toluene, and the mixture was allowed to react in the same manner as in Example 1, resulting in resin (A)-6 containing carboxyl groups that has a weight average molecular weight of 150,000, and glass transition temperature of 65° C.

EXAMPLE 7

One hundred parts by weight of a copolymer containing 75% by weight of styrene, 10% by weight of butyl acrylate, 10% by weight of methyl methacrylate and 5% by weight of monomethacryloyloxyethyl succinate, and 0.7% by weight of zinc oxide were added to toluene, and the mixture was allowed to react in the same manner as in Example 1, resulting in resin (A)-7 containing carboxyl groups that has a weight average molecular weight of 210,000, and glass transition temperature of 62° C.

EXAMPLE 8

One hundred parts by weight of a copolymer containing 80% by weight of styrene, 18% by weight of butyl methacrylate and 2% by weight of acrylic acid, and 0.7 parts by weight of calcium acetate were added to toluene, and the mixture was allowed to react in the same manner as in Example 1, resulting in resin (A)-8 containing carboxyl groups that has a weight average molecular weight of 250,000, and glass transition temperature of 67° C.

EXAMPLE 9

One hundred parts by weight of a copolymer containing 85% by weight of styrene, 12% by weight of butyl acrylate and 3% by weight of methacrylic acid, and 0.6 parts by weight of magnesium oxide were added to toluene, and the mixture was allowed to react in the same manner as in Example 1, resulting in resin (A)-9 containing carboxyl groups that has a weight average molecular weight of 180,000, and glass transition temperature of 61° C.

EXAMPLE 10

One hundred parts by weight of a copolymer containing 75% by weight of styrene, 10% by weight of methyl methacrylate, 11% by weight of butyl acrylate and 4% by weight of methacrylic acid, and 0.5 parts by weight of zinc oxide were added to toluene, and the mixture was allowed to react in the same manner as in Example 1, resulting in resin (A)-10 containing carboxyl groups that has a glass transition temperature of 65° C.

EXAMPLE 11

One hundred parts by weight of a copolymer containing 80% by weight of styrene, 15% by weight of butyl methacrylate and 5% by weight of acrylic acid, and 0.8 parts by weight of magnesium oxide were added to toluene, and the mixture was allowed to react in the same manner as in Example 1, resulting in resin (A)-11 containing carboxyl groups that has a glass transition temperature of 71° C.

EXAMPLE 12

One hundred parts by weight of a copolymer containing 70% by weight of styrene, 11% by weight of methyl methacrylate, 14% by weight of butyl acrylate and 5% by weight of monomethacryloyloxyethyl succinate, and 0.7 parts by weight of calcium acetate were added to toluene, and the mixture was allowed to react in the same manner as in Example 1, resulting in resin (A)-12 containing carboxyl groups that has a glass transition temperature of 67° C.

EXAMPLE 13

One hundred parts by weight of a copolymer containing 75% by weight of styrene, 13% by weight of methyl methacrylate, 7% by weight of butyl acrylate and 5% by weight of monomethacryloyloxyethyl succinate, and 0.5 parts by weight of magnesium oxide were added to toluene, and the mixture was allowed to react in the same manner as in Example 1, resulting in resin (A)-13 containing carboxyl groups that has a melt flow rate of 2.8 g/10 min. and weight average molecular weight of 210,000.

EXAMPLE 14

One hundred parts by weight of a copolymer containing 80% by weight of styrene, 6% by weight of butyl acrylate, 10% by weight of butyl methacrylate and 4% by weight of methacrylic acid, and 0.6 parts by weight of zinc oxide were added to toluene, and the mixture was allowed to react in the same manner as in Example 1, resulting in resin (A)-14 containing carboxyl groups that has a melt flow rate of 2.1 g/10 min. and weight average molecular weight of 280,000.

EXAMPLE 15

One hundred parts by weight of a copolymer containing 70% by weight of styrene, 15% by weight of methyl methacrylate, 12% by weight of butyl acrylate and 3% by weight of acrylic acid, and 0.7 parts by weight of calcium acetate were added to toluene, and the mixture was allowed to react in the same manner as in Example 1, resulting in resin (A)-15 containing carboxyl groups that has a melt flow rate of 21 g/10 min. and weight average molecular weight of 60,000.

PREPARATION OF RESIN (B) CONTAINING GLYCIDYL OR β-METHYLGLYCIDYL GROUPS

EXAMPLE 1

A mixture of glycidyl methacrylate, styrene and toluene was subjected to a polymerization reaction in the presence of benzoyl paroxide (i.e., a polymerization initiator) under toluene refluxing for 2.5 hours, after which the toluene was distilled off, thereby obtaining resin (B)-1 containing glycidyl groups. Resin (B)-1 was a copolymer containing 50% by weight of glycidyl methacrylate and 50% by weight of styrene as components thereof, and having a weight average molecular weight of 19,000 and glass transition temperature of 54° C.

EXAMPLE 2

Glycidyl acrylate and styrene were subjected to a polymerization reaction in the same manner as in Example 1 of this section, thereby obtaining resin (B)-2 containing glycidyl groups. Resin (B)-2 was a copolymer containing 30% by weight of glycidyl acrylate and 70% by weight of styrene as components thereof, and having a weight average molecular weight of 80,000 and glass transition temperature of 54° C.

EXAMPLE 3

A mixture of glycidyl methacrylate, styrene, butyl acrylate and toluene was subjected to a polymerization reaction in the presence of di-t-butylperoxyhexahydroterephthalate (i.e., a polymerization initiator) under toluene refluxing for 2.5 hours, after which the toluene was distilled off, thereby obtaining resin (B)-3 containing glycidyl groups. Resin (B)-3 was a copolymer containing 20% by weight of glycidyl methacrylate, 60% by weight of styrene and 20% by weight of butyl acrylate as components thereof, and having a weight average molecular weight of 150,000 and glass transition temperature of 58° C.

EXAMPLE 4

Glycidyl methacrylate, styrene and butyl acrylate were subjected to a polymerization reaction in the same manner as in Example 1 of this section, thereby obtaining resin (B)-4 containing glycidyl groups, Resin (B)-4 was a copolymer containing 55% by weight of glycidyl methacrylate, 35% by weight of styrene and 10% by weight of butyl acrylate as components thereof, and having a weight average molecular weight of 49,000 and glass transition temperature of 48° C.

EXAMPLE 5

Glycidyl acrylate, styrene and butyl methacrylate were subjected to a polymerization reaction in the same manner as in Example 1 of this section, thereby obtaining resin (B)-5 containing glycidyl groups. Resin (B)-5 was a copolymer containing 20% by weight of glycidyl acrylate, 70% by weight of styrene and 10% by weight of butyl methacrylate as components thereof, and having a weight average molecular weight of 25,000 and glass transition temperature of 61° C.

EXAMPLE 6

Glycidyl methacrylate, styrene and butyl acrylate were subjected to a polymerization reaction in the same manner as in Example 1 of this section, thereby obtaining resin (B)-6 containing glycidyl groups. Resin (B)-6 was a copolymer containing 45% by weight of glycidyl methacrylate, 45% by weight of styrene and 10% by weight of butyl acrylate as components thereof, and having a weight average molecular weight of 40,000 and glass transition temperature of 51° C.

EXAMPLE 7

Glycidyl methacrylate, styrene and butyl acrylate were subjected to a polymerization reaction in the same manner as in Example 1 of this section, thereby obtaining resin (B)-7 containing glycidyl groups. Resin (B)-7 was a copolymer containing 55% by weight of glycidyl methacrylate, 35% by weight of styrene and 10% by weight of butyl acrylate as components thereof, and having a weight average molecular weight of 220,000 and glass transition temperature of 52° C.

EXAMPLE 8

Glycidyl methacrylate, styrene and butyl methacrylate were subjected to a polymerization reaction in the same manner as in Example 1 of this section, thereby obtaining resin (B)-8 containing glycidyl groups. Resin (B)-8 was a copolymer containing 60% by weight of glycidyl methacrylate, and 25% by weight of styrene and 15% by weight of butyl methacrylate as components thereof, and having a weight average molecular weight of 170,000 and glass transition temperature of 55° C.

EXAMPLE 9

Glycidyl acrylate and styrene were subjected to a polymerization reaction in the same manner as in Example 1 of this section, thereby obtaining resin (B)-9 containing glycidyl groups. Resin (B)-9 was a copolymer containing 70% by weight of glycidyl acrylate and 30% by weight of styrene as components thereof, and having a weight average molecular weight of 120,000 and glass transition temperature of 50° C.

EXAMPLE 10

Glycidyl methacrylate, styrene and butyl methacrylate were subjected to a polymerization reaction in the same manner as in Example 1 of this section, thereby obtaining resin (B)-10 containing glycidyl groups. Resin (B)-10 was a copolymer containing 50% by weight of glycidyl methacrylate, 40% by weight of styrene and 10% by weight of butyl methacrylate as components thereof, and having a glass transition temperature of 56° C.

EXAMPLE 11

β-Methylglycidyl methacrylate, styrene and butyl acrylate were subjected to a polymerization reaction in the same manner as in Example 1 of this section, thereby obtaining resin (B)-11 containing glycidyl groups. Resin (B)-11 was a copolymer containing 20% by weight of β-methylglycidyl methacrylate, 75% by weight of styrene and 5% by weight of butyl acrylate as components thereof, and having a glass transition temperature of 59° C.

EXAMPLE 12

Glycidyl methacrylate, styrene and butyl acrylate were subjected to a polymerization reaction in the same manner as in Example 1 of this section, thereby obtaining resin (B)-12 containing glycidyl groups. Resin (B)-12 was a copolymer containing 60% by weight of glycidyl methacrylate, 35% by weight of styrene and 5% by weight of butyl acrylate as components thereof, and having a glass transition temperature of 54° C.

EXAMPLE 13

Glycidyl methacrylate, styrene and butyl methacrylate were subjected to a polymerization reaction in the same manner as in Example 1 of this section, thereby obtaining resin (B)-13 containing glycidyl groups. Resin (B)-13 was a copolymer containing 60% by weight of glycidyl methacrylate, 35% by weight of styrene and 5% by weight of butyl methacrylate as components thereof, and having a melt flow rate of 0.6 g/10 min. and weight average molecular weight of 230,000.

EXAMPLE 14

Glycidyl methacrylate and styrene were subjected to a polymerization reaction in the same manner as in Example 1 of this section, thereby obtaining resin (B)-14 containing glycidyl groups. Resin (B)-14 was a copolymer containing 50% by weight of glycidyl methacrylate and 50% by weight of styrene as components thereof, and having a melt flow rate of 63 g/10 min. and weight average molecular weight of 22,000.

EXAMPLE 15

Glycidyl methacrylate, styrene and butyl acrylate were subjected to a polymerization reaction in the same manner as in Example 1 of this section, thereby obtaining resin (B)-15 containing glycidyl groups. Resin (B)-15 was a copolymer containing 20% by weight of glycidyl acrylate, 65% by weight of styrene and 15% by weight of butyl acrylate as components thereof, and having a melt flow rate of 12 g/10 min. and weight average molecular weight of 220,000.

PREPARATION OF RESIN (C)

EXAMPLE 1

A mixture of styrene, butyl acrylate and toluene was subjected to a polymerization reaction in the presence of benzoyl peroxide (i.e., a polymerization initiator) under toluene refluxing, after which the toluene was distilled off, thereby obtaining resin (C)-1. Resin (C)-1 was a copolymer containing 75% by weight of styrene and 25% by weight of butyl acrylate as components thereof, and having a molecular weight of 350,000 corresponding to the peak of the molecular weight distribution curve and glass transition temperature of 59° C.

EXAMPLE 2

Styrene, methyl methacrylate and butyl acrylate were subjected to a polymerization reaction in the same manner as in Example 1 of this section, thereby obtaining resin (C)-2. Resin (C)-2 was a copolymer containing 75% by weight of styrene, 5% by weight of methyl methacrylate and 20% by weight of butyl acrylate as components thereof, and having a molecular weight of 625,000 corresponding to the peak of the molecular weight distribution curve and glass transition temperature of 66° C.

EXAMPLE 3

Styrene and butyl methacrylate were subjected to a polymerization reaction in the same manner as in Example 1 of this section, thereby obtaining resin (C)-3. Resin (C)-3 was a copolymer containing 80% by weight of styrene and 20% by weight of butyl methacrylate as components thereof, and having a molecular weight of 851,000 corresponding to the peak of the molecular weight distribution curve and glass transition temperature of 68° C.

Experiment 1

One hundred parts by weight of resin (A)-1, 7 parts by weight of resin (B)-1 and 5 parts by weight of carbon black (DIABLACK SH: Mitsubishi Chemical Industries Limited) were kneaded together with a roller for 10 minutes at 170° C. After cooling, the mixture was coarsely crushed and then pulverized in a jet mill, thereby obtaining a toner with a mean grain size of 11 μm.

Tests demonstrated that the blocking resistance of this toner was excellent.

The fixing temperature range of a finely powdered developer employing this toner was 160°-230° C., and very satisfactory fixing was possible over a wide temperature range. The fixation rate was excellent, i.e., 94%. Moreover, the toner particles exhibited stable charge retention, and the images so obtained were sharply defined and free of fogging. The results so obtained are summarized in Table 1.

Experiment 2

The same procedure was repeated as in Experiment 1, except that 100 parts by weight of resin (A)-2 and 35 parts by weight of resin (B)-2 were used instead of resin (A)-1 and resin (B)-1, respectively. The results so obtained are summarized in Table 1.

Experiment 3

The same procedure was repeated as in Experiment 1, except that 100 parts by weight of resin (A)-3 and 45 parts by weight of resin (B)-3 were used instead of resin (A)-1 and resin (B)-1, respectively. The results so obtained are summarized in Table 1.

Comparative Experiment 1

The same procedure was repeated as in Experiment 1, except that resin (B)-1 was not used. The results so obtained are summarized in Table 1. In this case, the fixing temperature range is narrower than those of the toners of Experiments 1 to 3.

Comparative Experiment 2

The same procedure was repeated as in Experiment 2, except that resin (B)-2 was not used. The results so obtained are summarized in Table 1. In this case, the fixing temperature range is narrower than those of the toners of Experiments 1 to 3.

Experiment 4

One hundred parts by weight of resin (A)-4, 20 parts by weight of resin (B)-4 and 5 parts by weight of carbon black (DIABLACK SH: Mitsubishi Chemical Industries Limited) were kneaded together with a roller for 10 minutes at 170° C. After cooling, the mixture was coarsely crushed and then pulverized in a jet mill, thereby obtaining a toner with a mean grain size of 11 μm.

This toner has a glass transition temperature of 58° C. In this toner, the molar ratio of glycidyl methacrylate to monomethacryloyloxyethyl succinate is 3.6.

Tests demonstrated that the blocking resistance of this toner was excellent.

The fixing temperature range of a finely powdered developer employing this toner was 160°-240° C., and very satisfactory fixing was possible over a wide temperature range. The fixation rate was excellent, i.e., 94%. Moreover, the toner particles exhibited stable charge retention, and the images so obtained were sharply defined and free of fogging. The results so obtained are summarized in Table 2.

Experiment 5

The same procedure was repeated as in Experiment 4, except that 100 parts by weight of resin (A)-5 and 35 parts by weight of resin (B)-5 were used instead of resin (A)-4 and resin (B)-4, respectively. The results so obtained are summarized in Table 2.

Experiment 6

The same procedure was repeated as in Experiment 4, except that 100 parts by weight of resin (A)-6 and 20 parts by weight of resin (B)-6 were used instead of resin (A)-4 and resin (B)-4, respectively. The results so obtained are summarized in Table 2.

Comparative Experiment 3

The same procedure was repeated as in Experiment 4, except that resin (B)-4 was not used. The results so obtained are summarized in Table 2. In this case, the fixing temperature range is narrower than those of the toners of Experiments 4 to 6.

Experiment 7

One hundred parts by weight of resin (A)-7, 6 parts by weight of resin (B)-7 and 5 parts by weight of carbon black (DIABLACK SH: Mitsubishi Chemical Industries Limited) were kneaded together with a roller for 10 minutes at 170° C. After cooling the mixture was coarsely crushed and then pulverized in a jet mill, thereby obtaining a toner with a means grain size of 11 μm.

Tests demonstrated that the blocking resistance of this toner were excellent.

The fixing temperature range of a finely powdered developer employing this toner was 160°-240° C., and very satisfactory fixing was possible over a wide temperature range. The fixation rate was excellent, i.e., 93%.

Furthermore, after 20,000 consecutive copies had been made, the fouling of the cleaning roller was assessed visually and evaluated on a five-grade scale, ranging from 1 (best) to 5 (worst). The result in the present case was 2 (good). Moreover, the charge retention of the toner particles was stable, while the images so obtained were sharply defined and free from fogging. The results so obtained are summarized in Table 3.

Experiment 8

The same procedure was repeated as in Experiment 7, except that 100 parts by weight of resin (A)-8 and 7 parts by weight of resin (B)-8 were used instead of resin (A)-7 and resin (B)-7, respectively. The results so obtained are summarized in Table 3.

Experiment 9

The same procedure was repeated as in Experiment 7, except that 100 parts by weight of resin (A)-9 and 15 parts by weight of resin (B)-9 were used instead of resin (A)-7 and resin (B)-7, respectively. The results so obtained are summarized in Table 3.

Comparative Experiment 4

The same procedure was repeated as in Experiment 7, except that resin (B)-7 was not used. The results so obtained are summarized in Table 3. This toner was inferior to those of Experiments 7 to 9 with respect to the fouling of the cleaning roller.

Experiment 10

One hundred parts by weight of resin (A)-10, 10 parts by weight of resin (B)-10, 40 parts by weight of resin (C)-1 and 5 parts by weight of carbon black (DIA- BLACK SH: Mitsubishi Chemical Industries Limited) were kneaded together with a roller for 10 minutes at 170° C. After cooling the mixture was coarsely crushed and then pulverized in a jet mill, thereby obtaining a toner with a mean grain size of 11 μm.

The mixture of 100 parts by weight of resin (A)-10 and 10 parts by weight of resin (B)-10 has a molecular weight of 13,000 corresponding to the peak of the molecular weight distribution curve.

Tests demonstrated that the blocking resistance of this toner were excellent.

The fixing temperature range of a finely powdered developer employing this toner was 170°-240° C., and very satisfactory fixing was possible over a wide temperature range. The fixation rate was excellent, i.e., 93%. Moreover, the toner particles exhibited stable charge retention, and the images so obtained were sharply defined and free of fogging. The results so obtained are summarized in Table 4.

Experiment 11

The same procedure was repeated as in Experiment 10, except that 100 parts by weight of resin (A)-11, 50 parts by weight of resin (B)-11 and 60 parts by weight of resin (C)-2 were used instead of resin (A)-10, resin (B)-10 and resin (C)-1, respectively. The results so obtained are summarized in Table 4.

Experiment 12

The same procedure was repeated as in Experiment 10, except that 100 parts by weight of resin (A)-12, 13 parts by weight of resin (B)-12 and 25 parts by weight of resin (C)-3 were used instead of resin (A)-10, resin (B)-10 and resin (C)-1, respectively. The results so obtained are summarized in Table 4.

Comparative Experiment 5

The same procedure was repeated as in Experiment 11, except that resin (B)-11 was not used. The results so obtained are summarized in Table 4. In this case, the fixing temperature range is narrower than those of the toners of Experiments 10 to 12.

Experiment 13

One hundred parts by weight of resin (A)-13, 4 parts by weight of resin (B)-13 and 5 parts by weight of carbon black (DIABLACK SH: Mitsubishi Chemical Industries Limited) were kneaded together with a roller for 10 minutes at 170° C. After cooling the mixture was coarsely crushed and then pulverized in a jet mill, thereby obtaining a toner with a mean grain size of 11 μm.

Tests demonstrated that the blocking resistance of this toner were excellent.

The fixing temperature range of a finely powdered developer employing this toner was 170°-240° C., and very satisfactory fixing was possible over a wide temperature range. The fixation rate was excellent, i.e., 93%.

Furthermore, after 20,000 consecutive copies had been made, the fouling of the cleaning roller was assessed visually and evaluated on a five-grade scale, ranging from 1 (best) to 5 (worst). The result in the present case was 2 (good). Moreover, the charge retention of the toner particles was stable, while the images so obtained were sharply defined and free from fogging. The results so obtained are summarized in Table 5.

Experiment 14

The same procedure was repeated as in Experiment 13, except that 100 parts by weight of resin (A)-14 and 20 parts by weight of resin (B)-14 were used instead of resin (A)-13 and resin (B)-13, respectively. The results so obtained are summarized in Table 5.

Experiment 15

The same procedure was repeated as in Experiment 13, except that 100 parts by weight of resin (A)-15 and 50 parts by weight of resin (B)-15 were used instead of resin (A)-13 and resin (B)-13, respectively. The results so obtained are summarized in Table 5.

Comparative Experiment 6

The same procedure was repeated as in Experiment 13, except that resin (B)-13 was not used. The results so obtained are summarized in Table 5. This toner was inferior to those of Experiments 13 to 15 with respect to the fouling of the cleaning roller.

TABLE 1

| | | Experiment 1 | | Experiment 2 | | Experiment 3 | | Comparative Experiment 1 | | Comparative Experiment 2 | |
|---|---|---|---|---|---|---|---|---|---|---|---|
| Toner formulation[1)] | Resin | (A)-1 | (B)-1 | (A)-2 | (B)-2 | (A)-3 | (B)-3 | (A)-1 | — | (A)-1 | — |
| | Amount of resin (parts by weight) | 100 | 7 | 100 | 35 | 100 | 45 | 100 | — | 100 | — |
| Components of resin (A) or (B) (% by weight) | Styrene | 80 | 50 | 72 | 70 | 82 | 60 | 80 | — | 72 | — |
| | Methyl methacrylate | — | — | 8 | — | — | — | — | — | 8 | — |
| | Butyl acrylate | 18 | — | 16 | — | — | 20 | 18 | — | 16 | — |
| | Butyl methacrylate | — | — | — | — | 14 | — | — | — | — | — |
| | Acrylic acid | 2 | — | 4 | — | — | — | 2 | — | 4 | — |
| | Glycidyl acrylate | — | — | — | 30 | — | — | — | — | — | — |
| | Glycidyl methacrylate | — | 50 | — | — | — | 20 | — | — | — | — |
| | Monomethacryloyloxyethyl succinate | — | — | — | — | 4 | — | — | — | — | — |
| | $Mg^{2+}$ (Magnesium oxide) | 0.7[2)] | — | — | — | — | — | 0.7[2)] | — | — | — |
| | $Zn^{2+}$ (Zinc oxide) | — | — | 0.7[2)] | — | 0.4[2)] | — | — | — | 0.7[2)] | — |
| Physical properties of resin | Glass transition temperature (°C.) | 60 | 54 | 61 | 54 | 61 | 58 | 60 | — | 61 | — |
| | Weight average molecular weight ($\times 10^4$) | 21.5 | 1.9 | 18 | 8 | 6.3 | 15 | 21.5 | — | 18 | — |
| Characteristics of | Blocking resistance | Good | | Good | | Good | | Good | | Good | |
| | Fixing temperature range (°C.) | 160-230 | | 160-230 | | 160-230 | | 160-220 | | 160-210 | |

TABLE 1-continued

| | | Experiment 1 | Experiment 2 | Experiment 3 | Comparative Experiment 1 | Comparative Experiment 2 |
|---|---|---|---|---|---|---|
| toner | Fixation rate (%) | 94 | 93 | 94 | 94 | 94 |

1)Each toner contains 5 parts by weight of carbon black.
2)Amount of the multivalent metal compound employed per 100 parts by weight of the copolymer composing the resin (A).

TABLE 2

| | | Experiment 4 | | Experiment 5 | | Experiment 6 | | Comparative Experiment 3 | |
|---|---|---|---|---|---|---|---|---|---|
| Toner | Resin | (A)-4 | (B)-4 | (A)-5 | (B)-5 | (A)-6 | (B)-6 | (A)-4 | — |
| formulation[1)] | Amount of resin (parts by weight) | 100 | 20 | 100 | 40 | 100 | 20 | 100 | — |
| Components | Styrene | 70 | 35 | 70 | 70 | 80 | 45 | 70 | — |
| of resin | Methyl methacrylate | — | — | 15 | — | 5 | — | — | — |
| (A) or (B) | Butyl acrylate | — | 10 | 10 | — | 10 | 10 | — | — |
| (% by weight) | Butyl methacrylate | 25 | — | — | 10 | — | — | 25 | — |
| | Methacrylic acid | — | — | — | — | 5 | — | — | — |
| | Glycidyl acrylate | — | — | — | 20 | — | — | — | — |
| | Glycidyl methacrylate | — | 55 | — | — | — | 45 | — | — |
| | Monomethacryloyloxyethyl succinate | 5 | — | 5 | — | — | — | 5 | — |
| | $Mg^{2+}$ (Magnesium oxide) | — | — | — | — | 0.5[2)] | — | — | — |
| | $Ca^{2+}$ (Calcium acetate) | 0.8[2)] | — | 0.7[2)] | — | — | — | 0.4[2)] | — |
| Physical | Glass transition temperature (°C.) | 68 | 48 | 65 | 61 | 65 | 51 | 68 | — |
| properties | Weight average molecular weight ($\times 10^4$) | 21 | 4.9 | 15.6 | 2.5 | 15 | 4 | 21 | — |
| | Molar ratio of multivalent metal compound to monomer (c) | 0.24 | | 0.19 | | 0.21 | | 0.24 | |
| | Molar ratio of monomer (d) to monomer (c) | 3.6 | | 2.7 | | 1.1 | | — | |
| | Glass transition of resin composition | 58 | | 62 | | 64 | | 68 | |
| Characteristics | Blocking resistance | Good | | Good | | Good | | Good | |
| of | Fixing temperature range (°C.) | 160–240 | | 160–230 | | 160–240 | | 170–220 | |
| toner | Fixation rate (%) | 94 | | 97 | | 94 | | 93 | |

1)Each toner contains 5 parts by weight of carbon black.
2)Amount of the multivalent metal compound employed per 100 parts by weight of the copolymer composing the resin (A).

TABLE 3

| | | Experiment 7 | | Experiment 8 | | Experiment 9 | | Comparative Experiment 4 | |
|---|---|---|---|---|---|---|---|---|---|
| Toner | Resin | (A)-7 | (B)-7 | (A)-8 | (B)-8 | (A)-9 | (B)-9 | (A)-7 | — |
| formulation[1)] | Amount of resin (parts by weight) | 100 | 6 | 100 | 7 | 100 | 15 | 100 | — |
| Components | Styrene | 75 | 35 | 80 | 25 | 85 | 30 | 75 | — |
| of resin | Methyl methacrylate | 10 | — | — | — | — | — | 10 | — |
| (A) or (B) | Butyl acrylate | 10 | 10 | — | — | 12 | — | 10 | — |
| (% by weight) | Butyl methacrylate | — | — | 18 | 15 | — | — | — | — |
| | Acrylic acid | — | — | 2 | — | — | — | — | — |
| | Methacrylic acid | — | — | — | — | 3 | — | — | — |
| | Glycidyl acrylate | — | — | — | — | — | 70 | — | — |
| | Glycidyl methacrylate | — | 55 | — | 60 | — | — | — | — |
| | Monomethacryloyloxyethyl succinate | 5 | — | — | — | — | — | 5 | — |
| | $Mg^{2+}$ (Magnesium oxide) | — | — | — | — | 0.6[2)] | — | — | — |
| | $Ca^{2+}$ (Calcium acetate) | — | — | 0.7[3)] | — | — | — | — | — |
| | $Zn^{2+}$ (Zinc oxide) | 0.6[2)] | — | — | — | — | — | 0.6[2)] | — |
| Physical | Glass transition temperature (°C.) | 62 | 52 | 67 | 55 | 61 | 50 | 62 | — |
| properties of resin | Weight average molecular weight ($\times 10^4$) | 21 | 22 | 25 | 17 | 18 | 12 | 21 | — |
| Characteristics | Blocking resistance | Good | | Good | | Good | | Good | |
| of | Fixing temperature range (°C.) | 160–240 | | 160–240 | | 160–240 | | 160–210 | |
| toner | Fixation rate (%) | 93 | | 95 | | 95 | | 94 | |
| | Fouling of cleaning roller | 2 | | 2 | | 2 | | 5 | |

1)Each toner contains 5 parts by weight of carbon black.
2)Amount of the multivalent metal compound employed per 100 parts by weight of the copolymer composing the resin (A).

TABLE 4

| | | Experiment 10 | | | Experiment 11 | | | Experiment 12 | | | Comparative Experiment 5 | |
|---|---|---|---|---|---|---|---|---|---|---|---|---|
| Toner | Resin | (A)-10 | (B)-10 | (C)-1 | (A)-11 | (B)-11 | (C)-2 | (A)-12 | (B)-12 | (C)-3 | (A)-11 | (C)-2 |
| formulation[1)] | Amount of resin (parts by weight) | 100 | 10 | 40 | 100 | 50 | 60 | 100 | 13 | 25 | 100 | 60 |
| Components | Styrene | 75 | 40 | 75 | 80 | 75 | 75 | 70 | 35 | 80 | 80 | 75 |
| of | Methyl methacrylate | 10 | — | — | — | — | 5 | 11 | — | — | — | 5 |
| resin | Butyl acrylate | 11 | — | 25 | — | 5 | 20 | 14 | 5 | — | — | 20 |
| (A), (B), or (C) | Butyl methacrylate | — | 10 | — | 15 | — | — | — | — | 20 | 15 | — |
| (% by weight) | Acrylic acid | — | — | — | 5 | — | — | — | — | — | 5 | — |
| | Methacrylic acid | 4 | — | — | — | — | — | — | — | — | — | — |
| | Monoacryloyloxyethyl | — | — | — | — | — | — | 5 | — | — | — | — |

TABLE 4-continued

| | | Experiment 10 | | | Experiment 11 | | | Experiment 12 | | | Comparative Experiment 5 | |
|---|---|---|---|---|---|---|---|---|---|---|---|---|
| | succinate | | | | | | | | | | | |
| | Glycidyl methacrylate | — | 50 | — | — | — | — | — | 60 | — | — | — |
| | β-methylglycidyl methacrylate | — | — | — | — | 20 | — | — | — | — | — | — |
| | $Mg^{2+}$ (Magnesium oxide) | — | — | — | 0.8[2)] | — | — | — | — | — | 0.8[2)] | — |
| | $Ca^{2+}$ (Calcium acetate) | — | — | — | — | — | — | 0.7[2)] | — | — | — | — |
| | $Zn^{2+}$ (Zinc oxide) | 0.5[2)] | — | — | — | — | — | — | — | — | — | — |
| Physical properties of resin | Glass transition Temperature (°C.) | 65 | 56 | 59 | 71 | 59 | 66 | 67 | 54 | 68 | 71 | 66 |
| | Item (1)+ ($\times 10^4$) | 1.3 | | 35 | 1.1 | | 62.5 | 0.7 | | 85.1 | 1.1 | 62.5 |
| Characteristics of toner | Blocking resistance | Good | | | Good | | | Good | | | Good | |
| | Fixing temperature range (°C.) | 170–240 | | | 160–240 | | | 160–240 | | | 160–220 | |
| | Fixation rate (%) | 93 | | | 95 | | | 94 | | | 95 | |

1)Each toner contains 5 parts by weight of carbon black.
2)Amount of the multivalent metal compound employed per 100 parts by weight of the copolymer composing the resin (A).
Item (1)+ : Molecular weight corresponding to the peak of the molecular weight distribution curve.

TABLE 5

| | | Experiment 13 | | Experiment 14 | | Experiment 15 | | Comparative Experiment 6 | |
|---|---|---|---|---|---|---|---|---|---|
| Toner formulation[1)] | Resin | (A)-13 | (B)-13 | (A)-14 | (B)-14 | (A)-15 | (B)-15 | (A)-13 | — |
| | Amount of resin (parts by weight) | 100 | 4 | 100 | 20 | 100 | 50 | 100 | — |
| Components of resin (A) or (B) (% by weight) | Styrene | 75 | 35 | 80 | 50 | 70 | 65 | 75 | — |
| | Methyl methacrylate | 13 | — | — | — | 15 | — | 13 | — |
| | Butyl acrylate | 7 | — | 6 | — | 12 | 15 | 7 | — |
| | Butyl methacrylate | — | 5 | 10 | — | — | — | — | — |
| | Acrylic acid | — | — | — | — | 3 | — | — | — |
| | Methacrylic acid | — | — | 4 | — | — | — | — | — |
| | Glycidyl acrylate | — | — | — | — | — | 20 | — | — |
| | Glycidyl methacrylate | — | 60 | — | 50 | — | — | — | — |
| | Monomethacryloyloxyethyl succinate | 5 | — | — | — | — | — | 5 | — |
| | $Mg^{2+}$ (Magnesium oxide) | 0.5[2)] | — | — | — | — | — | 0.5[2)] | — |
| | $Ca^{2+}$ (Calcium acetate) | — | — | — | — | 0.7[2)] | — | — | — |
| | $Zn^{2+}$ (Zinc oxide) | — | — | 0.6[2)] | — | — | — | — | — |
| Physical properties of resin | Weight average molecular weight ($\times 10^4$) | 21 | 23 | 28 | 2.2 | 6.0 | 22 | 21 | — |
| | Melt flow rate (g/10 min.) | 2.8 | 0.6 | 2.1 | 63 | 21 | 12 | 2.8 | — |
| Characteristics of toner | Blocking resistance | Good | | Good | | Good | | Good | |
| | Fixing temperature range (°C.) | 170–240 | | 160–240 | | 160–240 | | 170–220 | |
| | Fixation rate (%) | 93 | | 94 | | 94 | | 93 | |
| | Fouling of cleaning roller | 2 | | 2 | | 2 | | 5 | |

1)Each toner contains 5 parts by weight of carbon black.
2)Amount of the multivalent metal compound employed per 100 parts by weight of the copolymer composing the resin (A).

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A resin composition for toners used in the development of electrostatic images according to a hot roller fixing process, the composition providing reduced roller fouling and improved offset resistance characteristics, which composition comprises, as principal components, a resin (A) containing carboxyl groups and a resin (B) containing glycidyl or β-methylglycidyl groups, wherein said resin (A) is obtained by a reaction between a multivalent metal compound (m) and copolymer α, said multivalent metal compound (m) being at least one selected from the group consisting of an acetate of alkaline earth metal, an oxide of an alkaline earth metal, an acetate of a Group IIb metal and an oxide of a Group IIb metal and said copolymer α being obtained from a styrene monomer (a), a (meth)acrylic ester monomer (b), and a vinyl monomer (c) containing carboxyl groups, and said resin (B) is copolymer β obtained from a vinyl monomer (d) containing glycidyl or β-methylglycidyl groups and another vinyl monomer (e), said resin (B) comprising at least 10% by weight of monomer (d) and contained in an amount of 1–50 parts by weight for every 100 parts by weight of said resin (A), and wherein a melt flow rate of said resin (A) measured at a temperature of 150° C. under a load of 1200 g is at least 0.1 g/10 min. and a melt flow rate of said resin (B) measured at a temperature of 150° C. under a load of 1200 g is at least 0.1 g/10 min.

2. A resin composition for toners used in the development of electrostatic images according to claim 1, wherein said multivalent metal compound (m) is a compound containing an alkaline earth metal, or a compound containing a Group IIb metal.

3. A resin composition for toners used in the development of electrostatic images according to claim 1, wherein said multivalent metal compound (m) is a metal acetate or a metal oxide.

4. A resin composition for toners used in the development of electrostatic images according to claim 1, wherein the glass transition temperature of said resins (A) and (B) are both 40° or more.

5. A resin composition for toners used in the development of electrostatic images according to claim 1, which has the glass transition temperature of 40° C. or more.

6. A resin composition for toners used in the development of electrostatic images according to claim 4, wherein the weight average molecular weight of said resin (A) is in the range of 50,000 to 500,000, and the weight average molecular weight of said resin (B) is in the range of 10,000 to 500,000.

7. A resin composition for toners used in the development of electrostatic images according to claim 4, wherein said copolymer $\alpha$ is obtained from 40–95% by weight of said styrene monomer (a), 4–40% by weight of said (meth)acrylic ester monomer (b), and 1–20% by weight of said vinyl monomer (c) containing carboxyl groups.

8. A resin composition for toners used in the development of electrostatic images according to claim 4, wherein said multivalent metal compound (m) is contained in an amount of 0.1–1 mol for every 1 mol of said vinyl monomer (c) containing carboxyl groups that is contained in said copolymer $\alpha$ as a component thereof.

9. A resin composition for toners used in the development of electrostatic images according to claim 5, wherein the vinyl monomer (c) containing carboxyl groups is contained in an amount of 1–20% by weight in said copolymer $\alpha$, said multivalent metal compound (m) is contained in an amount of 0.1–1 mol for every 1 mol of said monomer (c), and said vinyl monomer (d) containing glycidyl or $\beta$ methylglycidyl groups is contained in an amount of 0.1–10 mol in said copolymer $\beta$ for every 1 mol of said monomer (c).

10. A resin composition for toners used in the development of electrostatic images according to claim 5, wherein said vinyl monomer (d) containing glycidyl or $\beta$-methylglycidyl groups is contained in an amount of 50% by weight or more in said resin (B), the weight average molecular weight of said resin (B) is 50,000 or more, and said resin (B) is contained in an amount of 1–30 parts by weight for every 100 parts by weight of said resin (A).

11. A resin composition for toners used in the development of electrostatic images according to claim 1, further comprising a resin (C) which is copolymer $\gamma$ obtained from a styrene monomer and a (meth)acrylic ester monomer, wherein the molecular weight corresponding to the peak of the molecular weight distribution curve of a reaction product of said resins (A) and (B) lies in the range of 3,000 to 80,000, and the molecular weight corresponding to the peak of the molecular weight distribution curve of said resin (C) lies in the range of 100,000 to 2,000,000.

12. A resin composition for toners used in the development of electrostatic images according to claim 1, wherein the melt flow rate of said resin (A) measured at a temperature of 150° C. under a load of 1200 g is in the range of 0.1–100 g/10 min., and the melt flow rate of said resin (B) measured at a temperature of 150° C. under a load of 1200 g is in the range of 0.1–100 g/10 min.

13. A resin composition for toners used in the development of electrostatic images according to claim 12, wherein said resin (B) is contained in an amount of 2–100 parts by weight for every 100 parts by weight of said resin (A).

14. A toner that contains a resin composition of claim 1.

15. A toner that contains a resin composition of claim 11.

16. A resin composition for toners used in the development of electrostatic images which comprises, as principal components, a resin (A) containing carboxyl groups and a resin (B) containing glycidyl or $\beta$-methylglycidyl groups, wherein said resin (A) is obtained by a reaction between a multivalent metal compound (m) and copolymer $\alpha$, said multivalent metal compound (m) being at least one selected from the group consisting of an acetate of alkaline earth metal, an oxide of an alkaline earth metal, an acetate of a Group IIb metal and an oxide of a Group IIb metal, and said copolymer $\alpha$ being obtained from a styrene monomer (a), a (meth)acrylic ester monomer (b), and a vinyl monomer (c) containing carboxyl groups, and said resin (B) is copolymer $\beta$ obtained from a vinyl monomer (d) containing glycidyl or $\beta$-methylglycidyl groups and another vinyl monomer (e), said resin (B) contained in an amount of 1–50 parts by weight for every 100 parts by weight of said resin (A).

* * * * *